Figure 1:
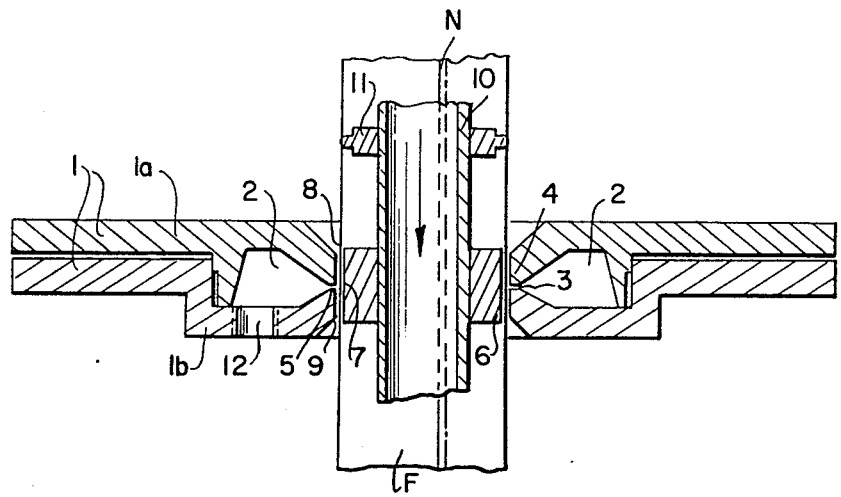

United States Patent
Kindl et al.

[15] 3,670,697
[45] June 20, 1972

[54] APPARATUS FOR COATING A TUBE OF FIBER MATERIAL WITH VISCOSE BY EXTRUSION

[72] Inventors: Erwin Kindl, Wiesbaden-Biebrich; Ernst Riegler, Niederwalluf, both of Germany

[73] Assignee: Kalle Aktiengesellschaft, Wiesbaden-Biebrich, Germany

[22] Filed: Dec. 23, 1970

[21] Appl. No.: 100,917

[30] Foreign Application Priority Data

Dec. 27, 1969 Germany ..................P 19 65 129.7

[52] U.S. Cl. ...........................................................118/408
[51] Int. Cl. ........................................................B05c 3/00
[58] Field of Search ..................118/DIG. 10, DIG. 11, 405, 118/407, 408, 254

[56] References Cited

UNITED STATES PATENTS

| | | | |
|---|---|---|---|
| 2,098,857 | 11/1937 | Buckingham | 118/408 |
| 3,357,397 | 12/1967 | Jackson | 118/407 |
| 3,568,640 | 3/1971 | Kuettner | 118/405 |

*Primary Examiner*—Henry S. Jaudon
*Attorney*—James E. Bryan

[57] ABSTRACT

This invention relates to an apparatus for coating a tube of fiber material with viscose, comprising an annular slot die and a backing element spaced therefrom to form a cylindrical passage having a width of 0.3 to 1.0 mm through which the tube can be passed, the slot in the die being directed transversely with respect to this passage and having its exit into this passage at a distance of at least 2 mm from the tube entry of this passage and of at least 2 mm and at least three times the width of said passage from the tube exit of this passage.

5 Claims, 2 Drawing Figures

INVENTORS
ERWIN KINDL
ERNST RIEGLER

BY  James E. Bryan
                ATTORNEY

APPARATUS FOR COATING A TUBE OF FIBER MATERIAL WITH VISCOSE BY EXTRUSION

This invention relates to apparatus for coating a tube of fiber material with viscose by extrusion.

Apparatus is known which consists of an annular die and a backing element, such as a mandrel, and which, in the production of fiber-reinforced cellulose tubes, is used to apply an outer or inner coating of viscose to tubes of fiber material that have been made from paper webs of long-fiber material by bonding together the two edges of the webs. The annular die and the backing element are secured to a frame and are brought into register in such a way that between them they form a cylindrical passage through which the tube to be coated passes while the layer of viscose is being applied to it. The viscose is passed to the tube by being pumped through the annular die, the annular slot of which is directed transversely of the passage through which the tube passes. If the annular slot is directed perpendicularly to this passage, it has the form of an annular disc, and if it is directed at an angle to the passage through which the tube passes, it is of conical shape. The viscose is applied, for internal coating through an annular die slot which is surrounded by the backing element, and for external coating through an annular die slot which surrounds the backing element. In the latter case, it has previously been the practice to dispose the annular die slot within the passage through which the tube passes directly at or very close to the entry to this passage. In some known coating apparatus, the tube is fed to the entry to the cylindrical passage through which it is to pass by way of a likewise cylindrical annular passage which, however, because of its considerably larger bore differs greatly from the cylindrical passage through which the tube is to pass for coating.

In the manufacture of fiber-reinforced cellulose tubes it is often considered necessary for the viscose to penetrate completely into the tube of fiber material before it passes into the bath in which the viscose is coagulated and regenerated to form cellulose. If coagulation takes place before the tube has been fully penetrated by the viscose, then a tube of fiber material is finally obtained that comprises regenerated cellulose of lower strength and poorer transparency than when coagulation and regeneration take place after full penetration of the tube by the viscose. What is required is a tube comprising a fiber fleece coated on the inside or outside with a layer of regenerated cellulose, which latter also completely penetrates the fiber fleece.

Penetration of the viscose into the tube of fiber material requires a certain time as does the coagulation of the viscose. Since in the continuous production of fiber-reinforced tubes of regenerated cellulose by the above-described method, the coating of the tube of fiber material with viscose and the coagulation of the viscose coating must take place while the tube is moving downwards without its having to be laid flat, such production calls for a plant the height of which increases with the required production rate and the length of time required for the penetration of the viscose into the tube, and for the coagulation of the viscose. It would therefore be very useful to be able to accelerate penetration of the viscose into the tube of fiber material. It has bee proposed to achieve this by coating the tube of fiber material with viscose, the temperature of which is higher than room temperature. However, one of the disadvantages of this proposal is that the viscose coagulates very easily when heated and is liable to block up the apparatus.

The present invention provides an apparatus for coating a tube of fiber material with viscose, the apparatus including an annular slot die and a backing element spaced therefrom to form a cylindrical passage having a width of 0.3 to 1.0 mm through which the tube can be passed, the slot in the die being directed transversely with respect to this passage and having its exit into this passage at a distance of at least 2 mm from the tube entry of this passage and of at least 2 mm and at least three times and preferably not more than 50 times the width of the passage from the tube exit of this passage.

In the coating of a tube of fiber material with viscose, the use of this apparatus accelerates the penetration of the viscose into the tube.

Figure 2:
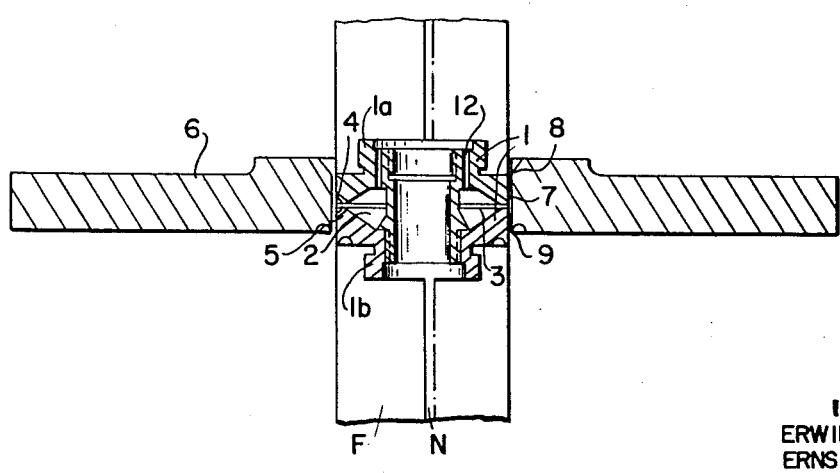

The invention is illustrated by way of example in the accompanying drawings in which:

FIG. 1 is a diagrammatic cross-section of one embodiment of the apparatus of the invention, and FIG. 2 is a similar view of a second embodiment.

Referring to FIG. 1 of the drawings, which illustrates an apparatus of the invention suitable for the external coating of a tube of fiber material with viscose, this apparatus consists primarily of an annular die 1 having an upper die portion 1a, a lower die portion 1b, and a backing element 6. The die 1 contains an annular chamber 2 from which a slot 3 between the upper portion 1a and the lower portion 1b of the die extends centrally inwards and leads to a cylindrical passage 7 located centrally within the portions 1a and 1b of the nozzle and between them and the element 6. In the upper portion 1a of the die the upper lip 4 of the die forms part of this passage and in the lower portion 1b of the die the lower lip 5 of the die forms the lower part of the passage. The passage has an entry opening 8 and an exit opening 9. Centrally disposed in the passage is the cylindrical backing element 6 in the form of a mandrel. It is secured to a central tube 10 and over it passes a tube F of fiber material the longitudinal seam of which is designated by the letter N. For guiding the tube F a number of guide rings, one of which is shown at 11, are fitted around the tube 10. Viscose is pumped through a feed orifice 12 into the annular chamber 2.

FIG. 2 of the drawings illustrates an apparatus suitable for internal coating. In this case the die slot 3 extending from the annular chamber 2 is outwardly directed and the backing element 6 surrounds the slot 3.

The greater the width ($w$) of the passage 7 through which the tube passes, the greater must be the distance ($a$) of the die slot 3 from the exit opening 9 of said passage. The following values for distances $a$ were found to be useful in conjunction with the indicated widths $w$ of the passage 7, both sets of values being expressed in mm:

| $w$ | 0.3 | 0.4 | 0.6 | 0.8 | 1.0 |
|---|---|---|---|---|---|
| $a$ | 2–5 | 2–10 | 1–15 | 3–30 | 5–50 |

This relationship applies in the coating of tubes of fiber material that are produced from fiber fleeces approximately 0.06 to 0.12 mm in thickness. A smaller width $w$ should be used for tubes of greater wall-thickness, and greater widths $w$ for tubes of smaller wall-thickness.

Preferably, the distance between the slot 3 and the exit opening 9 is not less than 3 mm and not more than 15 mm, and the width of the passage 7 through which the tube passes is not less than 0.4 and not more than 0.8 mm.

Corresponding intermediate values apply in the case of widths other than those given in the above table. The following relationship appears to hold good, with reasonable approximation to values recorded in practice, for the minimum value of the distance $a$ in relation to the width $w$, both expressed in mm:

$$a_{min} = 5 \times w^2,$$

however a minimum value of 2 mm being used if a smaller distance results from the above equation. The following relationship seems to apply, with good approximation to the values found in practice, for the maximum value of the distance:

$$a_{max} = 50 \, w^2.$$

That part of the passage 7 that extends from the entry opening 8 to the exit from the die slot 3 is usually of the same or approximately the same length as that part thereof extending from the exit from the die slot 3 to the exit opening 9 of the passage 7. The difference in the lengths of the two parts of the passage 7 through which the tube passes is preferably not more than 2 mm. These two parts of the passage 7 are defined on the one hand by the upper lip 4 and by the lower lip 5 respectively of the annular die and, on the other hand, by the backing element 6. The length of the latter is often somewhat greater than the sum of the thickness of the upper lip 4, the width of the slot 3 in the annular die and the thickness of the lower lip 5, the backing element 6 preferably projecting at the entry opening 8.

Generally, the widths of the two parts of the passage 7 are the same or substantially the same, i.e. they do not differ from one another by more than 0.2 mm. However, equality of the widths of both parts is not a prerequisite for obtaining the result to be achieved according to the invention.

The slot 3 of the die generally has a width of less than 1 mm, and its length in the radial direction is usually only a few millimeters, i.e. 2 to 3 mm. However, neither the width nor the length of the slot 3 seems to have a marked effect upon the maximum rate at which the tube of fiber material can be coated with viscose without failure of the viscose to completely saturate the tube or the occurrence of other undesirable effects during the production of a fiber-reinforced cellulose tube. The quantity of viscose applied to one unit of area of the tube depends upon the quantity of viscose forced through the slot 3 during each unit of time, assuming the rate of travel of the tube to be the same.

The slot 3 is preferably directed perpendicularly to the passage 7 through which the tube passes, but it instead can be downwardly inclined towards this passage.

The length of the lower part of the passage 7 that extends from the slot 3 to the exit opening 9 influences the rate at which the viscose penetrates into the tube of fiber material. If it is shorter than provided for in the invention, the viscose penetrates too slowly into the tube, so that the advantage provided by the invention is not achieved. On the other hand, the lower part of the passage 7 preferably should not exceed the above-stated maximum length, since material and space would then be used unnecessarily. Acceleration of the penetration of the viscose into the tube of fiber material as a result of the form of the lower part of the passage 7 as proposed in the invention, can only be exploited, however, by raising the rate at which the process is carried out, when the upper part of the passage 7 is of the length provided for in the invention, since otherwise the viscose oozes out of the entry opening 8 of the passage. The same applies when the passage 7 is too wide in the upper part.

As already stated, the upper part of the passage 7 that extends from the entry opening 8 to the die slot 3 performs the function of preventing viscose from being forced so far upwards through the passage 7 that viscose escapes at the entry opening 8. To prevent this, the upper part of the passage 7, instead of being made long enough to enable it to perform this function, can be made narrower than the lower part of the passage 7; however, the upper part of this passage should be neither shorter than 2 mm nor narrower than 0.3 mm.

The apparatus of the invention is suitable for coating tubes of fiber material that are produced from fiber fleeces having a thickness of approximately 0.06 to 0.12 mm. Fiber fleeces of this thickness are generally used in the production of fiber-reinforced synthetic sausage casings of regenerated cellulose. Tubes of fiber material having a diameter of 30 mm or more can be coated with the described apparatus. There seems to be no upper limit as regards diameter, since tubes of fiber material of relatively large diameter — up to 160 mm — have been equally successfully coated using apparatus in accordance with the invention.

The apparatus of the invention has the effect of causing the viscose applied to the tube of fiber material to penetrate the tube more rapidly than in the known apparatus. Therefore, with a given height of coating plant, the coating operation can be carried out more rapidly than previously since, because of the shorter distance that the tube has to travel through the air to be fully impregnated after leaving the apparatus, the bath in which the viscose has to be coagulated can be made correspondingly deeper and operations consequently can be carried out more rapidly. Conversely, the apparatus renders it possible to achieve a prescribed operating rate with coating equipment the height of which is less than was previously possible.

The following examples further illustrate the application of apparatus of the invention.

Example 1

For producing a fiber-reinforced cellulose casing, apparatus having the following dimensions was used in the external coating of a tube of fiber material:

| | |
|---|---|
| Outside diameter of the passage through which the tube passes, measured at the lips of the die | 97.20 mm |
| Outside diameter of the backing element or mandrel (inside diameter of the passage) | 96.00 mm |
| Width of the passage | 0.60 mm |
| Thickness of upper lip of the die | 5.0 mm |
| Thickness of lower lip of the die | 4.0 mm |
| Width of die slot | 0.50 mm |
| Length of die slot | 2.0 mm |
| Length of mandrel (backing element) | 20.0 mm |

For producing the tube of fiber material, use was made of a long-fibered paper having a weight of 21.2 g per square meter, and of a thickness of fleece of 0.09 mm.

When laid flat, the finished casing of fiber material had a width of 140 mm and a weight of 100 g per square meter. It contained 22.5 percent of glycerol and 8.3 percent of water. The bursting pressure of the wetted skin was found to be 0.72 atmosphere. The bursting pressure was determined on a portion of casing 50 cm in length after wetting for 15 minutes, by inflating the skin with compressed air to the bursting point.

With a 14 second period of travel through air between the die and the surface of the coagulating bath, the viscose, which had a viscosity of 9,650 cP, had completely penetrated into the long-fibered fleece, so that the finished skin of cellulose and fiber material possesses the required translucent and parchment-like appearance.

When apparatus of known design is used, periods of travel through the air of about 40 seconds are required.

Example 2

For producing a fiber-reinforced cellulose casing having a width when laid flat of 76 mm and a weight of 85 g per square meter, use was made of apparatus having the following dimensions for externally coating the tube with viscose having a viscosity of 11,300 cP:

| | |
|---|---|
| Outside diameter of the passage through which the tube passes, measured at the lips of the die | 53.50 mm |
| Outside diameter of the backing element or mandrel (inside diameter of the passage) | 52.00 mm |
| Width of the passage | 0.75 mm |
| Thickness of upper lip of the die | 10.0 mm |
| Thickness of lower lip of the die | 9.0 mm |
| Width of die slot | 0.40 mm |
| Length of die slot | 1.5 mm |
| Length of mandrel | 25.0 mm |

The weight per square meter of the fiber paper used was 17 g. The thickness of the paper was 0.07 mm.

The finished artificial casing contained 21.7 percent of glycerol and 10.2 percent of water. The bursting pressure of the wetted skin, determined in the previously described manner, was found to be 0.85 atmosphere.

During a 12 second period of travel through the air, the viscose had completely penetrated into the long-fibered fleece, so that the fibers were completely surrounded by regenerated cellulose, and boundary faces between the fibers and air no longer existed.

Example 3

For producing a fiber-reinforced cellulose casing having a width of 92 mm when laid flat and a weight per square meter of 90 g, use was made of apparatus having the following dimensions for internally coating a tube of fiber material:

| | |
|---|---|
| Inside diameter of the passage through which the tube passes, measured at the lips of the die | 61.70 mm |
| Inside diameter of the backing element (outside diameter of the passage) | 63.00 mm |
| Width of the passage | 0.65 mm |
| Thickness of the upper lip of the die | 10.0 mm |
| Thickness of the lower lip of the die | 9.0 mm |
| Width of the die slot | 0.60 mm |
| Length of the die slot | 3.0 mm |
| Length of the backing element | 25.0 mm |

The viscose had a viscosity of 12,460 cP.

The weight per square meter of the long-fibered fleece employed was 21.2 g, corresponding to a thickness of 0.09 mm.

The finished artificial casing contained 24.2 percent of glycerol and 8.3 percent of water. The bursting pressure of the wetted casing was 0.92 atmosphere.

During an 18 second period of travel through air, the viscose had fully penetrated into the fiber fleece.

It will be obvious to those skilled in the art that many modifications may be made within the scope of the present invention without departing from the spirit thereof, and the invention includes all such modifications.

What is claimed is:

1. An apparatus for coating a tube of fiber material with viscose, comprising an annular slot die and a backing element spaced therefrom to form a cylindrical passage having a width of 0.3 to 1.0 mm through which the tube can be passed, the slot in the die being directed transversely with respect to this passage and having its exit into this passage at a distance of at least 2 mm from the tube entry of this passage and at a distance of at least 2 mm and also of at least three times the width of the said passage from the tube exit of this passage.

2. An apparatus according to claim 1 in which the exit of the slot in the annular die into the said passage is at a distance of not more than 50 times the width of the said passage from the tube exit of this passage.

3. An apparatus according to claim 1 in which the distance between the exit of the slot in the annular die into the passage through which the tube passes from the tube exit of this passage is at least 2 mm, but not less than $5 \times w^2$ and not more than $50 \, w^2$, $w$ being the numerical value of the width of the said passage in millimeters.

4. An apparatus according to claim 1 in which the distances between the exit of the slot in the annular die into the passage through which the tube passes from the tube entry and tube exit of this passage differ from one another by not more than 2 mm.

5. An apparatus according to claim 1 in which the distance between the exit of the slot in the annular die into the passage through which the tube passes from the tube exit of this passage is 3 to 15 mm, and the width of the said passage is 0.4 to 0.8 mm.

* * * * *